United States Patent [19]

Cumpston

[11] 4,042,183

[45] Aug. 16, 1977

[54] ROTOR FOR MIXER-REFINER-REACTOR

[76] Inventor: Edward H. Cumpston, 43 Monument Ave., Old Bennington, Vt. 05201

[21] Appl. No.: 678,997

[22] Filed: Apr. 21, 1976

[51] Int. Cl.$^2$ .............................................. B02C 7/12
[52] U.S. Cl. ................................ 241/292.1; 241/294; 241/260
[58] Field of Search ............... 241/190, 235, 236, 242, 241/243, 260, 292.1, 294, 298, 293, 295, 296, 297

[56] References Cited

U.S. PATENT DOCUMENTS

| 737,543 | 8/1903 | Wisner | 241/292.1 |
|---|---|---|---|
| 2,986,347 | 5/1961 | Stevenson | 241/294 |
| 3,196,916 | 7/1965 | Urshel | 241/294 |
| 3,806,050 | 4/1974 | Cumpston, Jr. | 241/260 |
| 3,866,844 | 2/1975 | Montgomery | 241/292.1 |

Primary Examiner—Granville Y. Custer, Jr.
Attorney, Agent, or Firm—Stonebraker, Shepard & Stephens

[57] ABSTRACT

The inventive rotor operates in a mixer-refiner-reactor of the type shown in U.S. Pat. No. 3,806,050. The rotor body is formed with axially extending dovetail slots opening radially inward from the cylindrical periphery of the rotor body. The slots are filled with transverse plates having bases that fit in the slots, and each of the plates has a projection extending radially outward beyond the periphery of the rotor body to provide a working surface for engaging material. The plates can be set at angles relative to a plane perpendicular to the axis of the rotor body, and liner strips preferably fit between the bases of the plates and the inside surfaces of the slots. Spacer plates can be fitted in the slots between the plates having projections, which can vary from a single projection extending substantially across a slot to shorter projections in different transverse positions relative to the slot. Projections in different transverse positions can be ordered in a sequence repeating along the length of the slot so that the projections cooperate in moving material in an axial direction as the rotor turns.

17 Claims, 22 Drawing Figures

ROTOR FOR MIXER-REFINER-REACTOR

BACKGROUND OF THE INVENTION

The rotor for a mixer-refiner-reactor such as shown in U.S. Pat. No. 3,806,050 has raised bars for working through relatively viscous material under control of a stator that also has raised bars. The rotor bars are oriented to move a layer of material circumferentially through the stator, to move through the material as the layer moves, and to force the material axially back and forth as the bars pass through. The net orientation of the rotor bars relative to axial movement of material is preferably approximately neutral, with a slight tendency to favor one axial direction being tolerable.

The rotor bars tend to wear somewhat and are preferably formed of a relatively hard material. For example, U.S. Pat. No. 3,806,050 suggested casting groups of rotor bars on blocks of hard material and mounting rows of blocks on the rotor body. Since rotor bars have to be replaced occasionally, the total cost of rotor bar replacement is an important factor in the acquisition and operation of the machine.

The invention involves recognition of the problems and expense of rotor bar fabrication and replacement, and seeks a rotor construction that is simpler, cheaper, more efficient, and allows easy bar replacement. The invention also seeks versatility and a simple way of varying rotor bar configurations.

SUMMARY OF THE INVENTION

The inventive rotor has a generally cylindrical body extending axially of the mixer-refiner-reactor, and the body has several axially extending slots opening radially inward from the cylindrical periphery of the body. The slots are narrower at the body periphery than in a radially inward region, and flat plates extending transversely of the slots are held in the slots by having bases that fit the slots to prevent radial outward movement of the plates. The slots are substantially filled with the plates, or with a combination of plates and spacers, and each of the plates has a projection extending radially outward beyond the periphery of the body to provide a working surface engaging material being worked through the mixer-refiner-reactor. Liner strips are preferably fitted between the bases of the plates and the inside surfaces of the slots, and wedges in the end regions of the slots can be used for orienting the plates at uniform acute angles to a plane perpendicular to the axis of the rotor body. The plate projections can differ from each other in transverse position relative to the slot, and plates with different projections are preferably ordered relative to each other in a sequence repeating along the length of the slot to cooperate in moving material in an axial direction as the rotor turns.

DRAWINGS

DETAILED DESCRIPTION

The inventive rotor applies to a mixer-refiner-reactor of the general type shown in U.S. Pat. No. 3,806,050, the disclosure of which is hereby incorporated by reference to show how the mixer operates. Further operational information is disclosed in my copending U.S. patent application Ser. No. 653,072, filed Jan. 28, 1976, entitled METHOD OF CORRELATING THE ROTOR AND STATOR IN A MIXER-REFINER-REACTOR, the disclosure of which is hereby incorporated by reference as background information.

Figure 1:
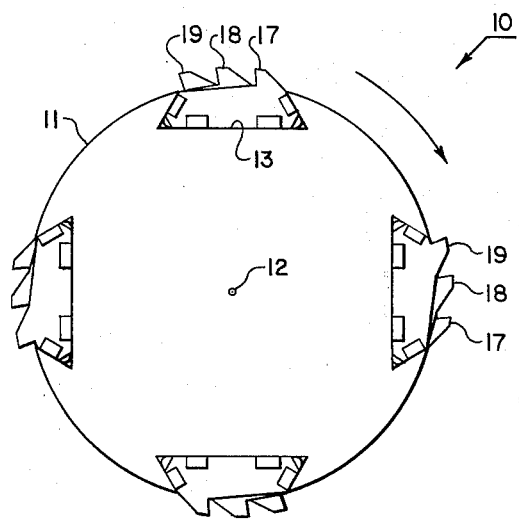
FIG. 1 is a partially schematic end elevational view of a rotor according to the invention with a rotor end plate removed.
Figure 2:
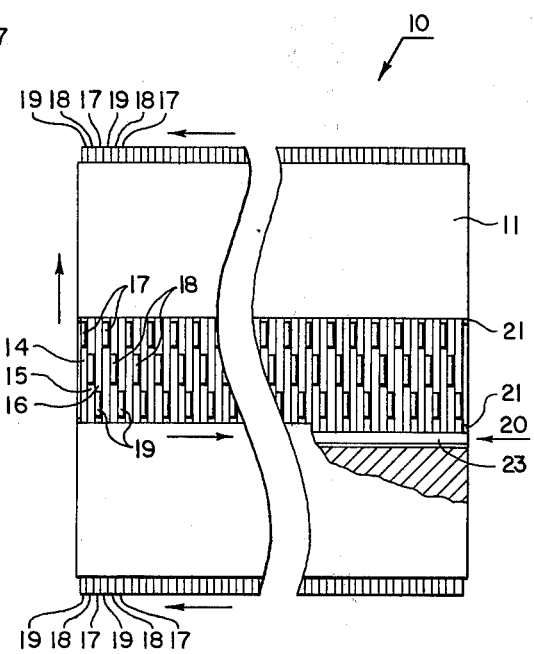
FIG. 2 is a partially cut-away, side elevational view of the rotor of FIG. 1.
Figure 3:
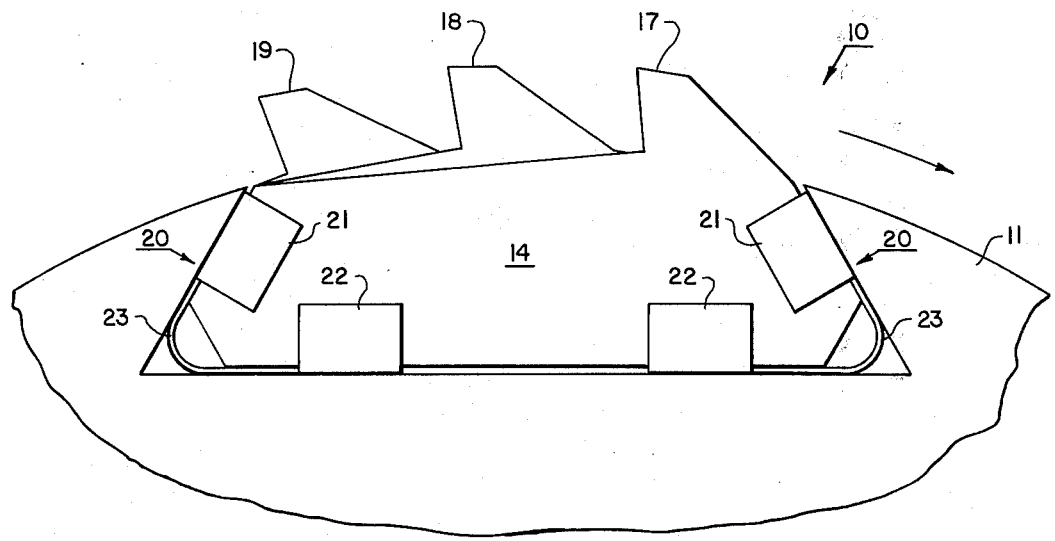
FIG. 3 is a fragmentary enlargement of the end elevational view of FIG. 1.

Rotor 10 is shown in FIGS. 1-3 as lacking a retaining end plate for best illustrating several aspects of the invention. Rotor 10 has a generally cylindrical body 11 that extends axially of the mixer (not shown), and body 11 rotates rapidly on its axis 12 to turn in the direction of the arrow. Body 11 has several slots 13 that open radially inward from the cylindrical periphery of body 11 and preferably extend for the full axial length of body 11 and are preferably parallel with axis 12. Different numbers of slots 13 can be used, but an even number of slots 13 is preferred. Slots 13 are dovetail shaped in cross section as illustrated, so that slots 13 are narrower at the periphery of body 11 than in a region radially inward from the periphery of body 11, and although a dovetail shape is preferred, other cross-sectional configurations for slots 13 can be used.

A plurality of preferably flat plates such as shown in FIGS. 4-10 and described in more detail below are arranged to extend transversely across slots 13 so that the plates, either alone or in combination with spacers, fill the whole axial length of each of the slots 13. Each of the plates or spacers has a base shaped for retention in slot 13 to prevent radial outward movement of the plates from slots 13. The plates then do not require any separate retainer device, because centrifugal force urges them radially outward in a snug fit with each slot.

Figure 4:
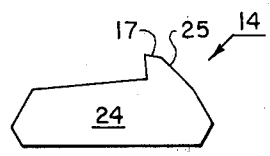
FIGS. 4-10 are side elevational views of various preferred plates for use in the inventive rotor.
Figure 5:
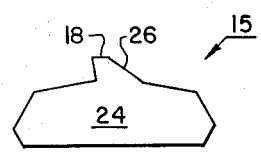
Figure 6:
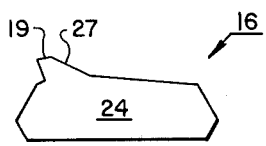

The particular plates 14-16 that are shown in the assembled rotor 10 are best illustrated in FIGS. 4-6, and have respective projections 17-19. Each of the slots 13 is completely filled with plates 14-16 arranged transversely in a row extending for the full length of each slot 13. The bases 24 for plates 14-16 retain the plates withing slots 13, and the leading and trailing edges of bases 24 are preferably covered or enclosed with a pair of liner strips 20 best shown in FIG. 3.

Liner strips 20 have a curved body 23 fitting into and extending axially for the full length of each of the slots 13, and tabs 21 and 22 are bent inward at each end of strips 20. Liner strips 20 aid in assembling and mounting plates 14-16 which can be arranged in a row within the end tabs 21 and 22 of a pair of opposed strips 20, and then the plates and strips can be slid endwise together into a slot 13. Also, since plates 14-16 are preferably stamped out with a punch press and do not need machined or especially smooth edges, liner strips 20 are preferred for separating the rough edges of plates 14-16 from the smoothly machined inner surfaces of slots 13. Liner strips 20 can be economically replaced, and they protect the inside surfaces of slots 13 against marring or damage.

A row of plates 14-16 and the edge-encircling liner strips 20 preferably fit snugly in each of the slots 13, but a tight fit is not necessary, because centrifugal force from the high-RPM rotation of rotor 10 urges plates 14-16 and liner strips 20 radially outward and prevents any moving or jiggling about of plates 14-16 and liner strips 20 during operation. Recognition of the capacity of the centrifugal force for keeping rotor parts firmly in place allows simplification of the rotor construction.

Cutting plates 14-16 in a punch press is cheaper than making rotor bar castings, and projections 17-19 are preferably hardened to achieve a long wear life. The base portions 24 of plates 14-16 are all identical as illustrated and fit snugly within liner strips 20 and slots 13, and projections 17-19 extend radially outward beyond the cylindrical periphery of rotor body 11. Projections 17-19 then serve as working surfaces moving through relatively thick or viscous material and forcing it back and forth axially at the same time. Projections 17-19 also sweep a layer of the material through a stator (not shown) that automatically regulates the material movement.

Figure 11:
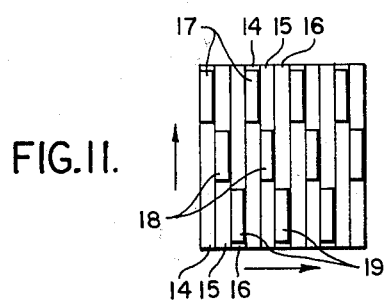
FIGS. 11-16a are plan views of several preferred arrangements of plates and projections in the inventive rotor.
Figure 11A:
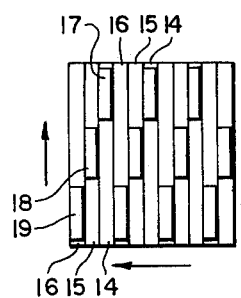

Plates 14-16 can be arranged within slots 13 in several preferred ways for engaging and moving material circumferentially through the stator and for forcing the material axially back and forth. One preferred arrangement is shown in FIG. 11 and the central portion of FIG. 2, where plates are arranged next to each other in a left-to-right sequential order 14, 15, 16, 14, 15, 16, etc. With the rotor turning in the direction of the arrow at the side of FIG. 11, projections 17-19 are successively ordered for effectively moving the material toward the right, as indicated by the arrow at the bottom of FIG. 11. FIG. 11a shows the opposite left-to-right order 16, 15, 14, 16, 15, 14, etc. for axially forcing material to the left as indicated by the arrow at the bottom of FIG. 11a when the rotor moves in the direction of the arrow at the side of FIG. 11a. Preferably, alternate rotor slots are filled with plates ordered as shown in FIG. 11, and the rest of the rotor slots are filled with plates ordered as shown in FIG. 11a. Altering the direction of axial movement for the projections in rotationally successive rows of slots is also illustrated in FIG. 2, and all the plates in a single slot are preferably ordered in the same sequence throughout the length of the slot. Rotationally successive rows of projections 17-19 then force material alternately back and forth axially as the rotor turns.

The respective leading edges 25-27 for projections 17-19 do most of the work on the material, and projections 17-19 are preferably angularly spaced apart relative to the direction of rotation as best shown in FIG. 1 so that each of the leading edges 25-27 engages and works on the material. Projections 17-19 then can be perpendicular to the rotor axis and rely on their successive ordering to move material in both axial directions as illustrated FIGS. 11 and 11a. Each of the projections 17-19 produces a boat-wake effect in the material it moves through, and a rotationally succeeding projection works along an inside edge of the boat wake for enhancing material movement axially one way or the other, depending on the sequence ordering of projections 17-19 relative to each other. The material is then engaged and sheared by the leading edges 25-27 and forced axially back and forth by the differences in the ordering of plates 14-16.

Figure 12:
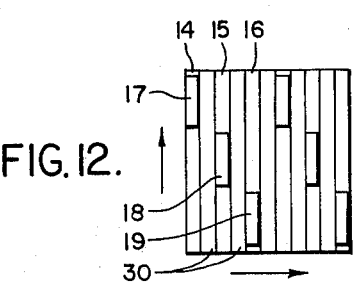
Figure 12A:
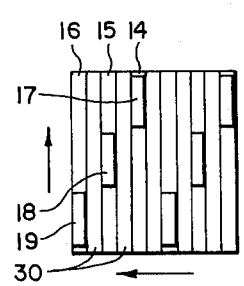

The plate arrangement of FIGS. 12 and 12a differs from the arrangement of FIGS. 11 and 11a only in the use of spacer plates 30 that have bases that are preferably identical to the bases 24 of plates 14-16, but lack any of the projections 17-19. Spacer plates 30 are arranged between each of the plates 14-16 for axially spacing projections 17-19 farther apart. The operating effect is similar to the arrangement of FIGS. 11 and 11a, except that there are about half as many projections 17-19 in each slot 13. The wider spacing and reduced number of projections 17-19 in the arrangement of FIGS. 12 and 12a provides more room for a material that could not move through between more closely spaced projections, because of particle size or viscosity. It is important that the material being worked does not pack or lodge between projections 17-19, which must move through the material as the rotor turns. The ordering of projections 17-19 as shown in FIG. 12 moves the material to the right as shown by the arrow at the bottom of FIG. 12 when the rotor turns in the direction of the arrow at the side of FIG. 12, and conversely, the ordering of projections 17-19 in FIG. 12a move material in the axially opposite direction as shown by the arrow at the bottom of FIG. 12a when the rotor turns in the same direction as shown by the arrow at the side of FIG. 12a.

Figure 13:
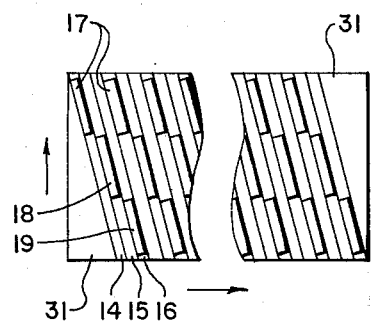
Figure 13A:
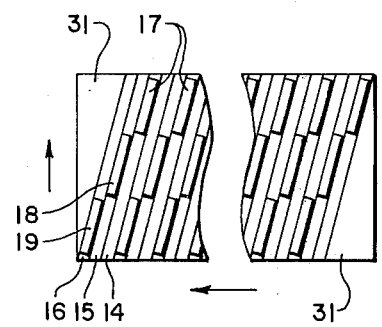

FIGS. 13 and 13a correspond with the ordering of FIGS. 11 and 11a, but set plates 14-16 at an oblique angle to a plane perpendicular to the axis 12 of rotor body 11 by using wedges 31 at opposite ends of each row of plates. Wedges 31 preferably have an angle of about 15° so that plates 14-16 are all uniformly inclined about 15° to one side or the other of a plane perpendicular to the rotor axis. The inclination of plates 14-16 improves the gripping force of the rotor, because not only the leading edges 25-27 engage and work on the material, but the side surfaces of projections 17-19 that obliquely face the material as the rotor turns also engage and move material. In addition, the working force applied and the axial movement of the material back and forth are increased by setting plates 14-16 at an angle as shown in FIGS. 13 and 13a.

Figure 14:
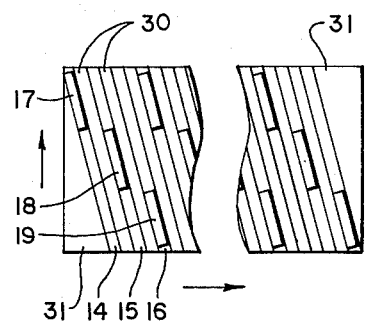
Figure 14A:
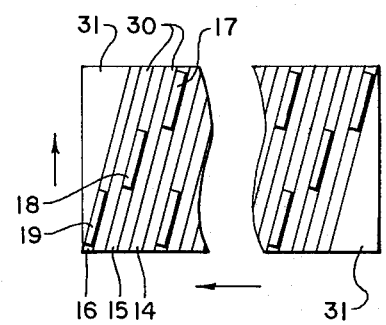

FIGS. 14 and 14a correspond with the ordering of FIGS. 12 and 12a and include spacer plates 30, but set plates 14-16 at an angle to a plane perpendicular to the rotor axis in a way similar to the arrangement of FIGS. 13 and 13a. Both the leading edges and the material-confronting side edges of projections 17-19 engage and move the material about in the arrangement of FIGS. 14 and 14a, and spacer plates 30 reduce the number of projections 17-19 and provide more clearance to keep material from lodging between projections.

Three projections 17-19 spaced in three transverse positions relative to slots 13 are convenient for positioning projection 17 along the rotationally leading edge of the slot, projection 19 along the rotationally trailing edge of the slot, and projection 18 in an intermediate position between projections 17 and 19. However, the invention can also be practiced with different plates for filling the rotor slots, and examples of these are explained below.

Figure 7:
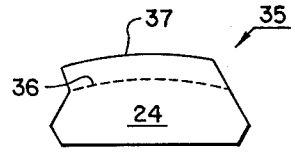

Plate 35 of FIG. 7 has a base portion 24 below the broken line 36, which is aligned with the periphery of the rotor body when plate 35 is in a rotor slot. The portion of plate 35 above broken line 36 forms a projection 37 that extends substantially across the transverse extent of the retaining slot in the rotor so that projection 37 forms a relatively long rotor bar compared to relatively short projections 17-19.

Figure 15:
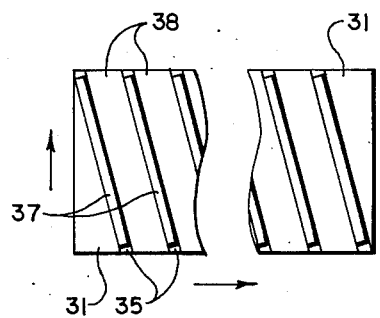
Figure 15A:
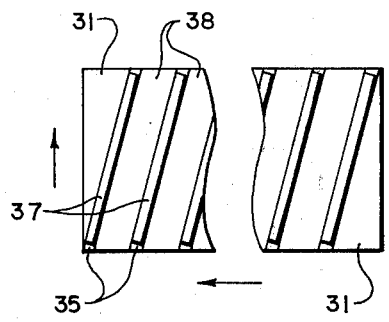

A preferred way of arranging plates 35 is shown in FIGS. 15 and 15a where wedges 31 are used to incline plates 35 at an acute angle to a plane perpendicular to the rotor axis. Relatively thick spacer plates 38, preferably shaped like the base portion 24 of plates 35, are placed between plates 35 as illustrated to provide room for material to move between projections 37. Preferably, projections 37 are close enough together so that the entire axial extent of the rotor is swept by projections 37 with no unswept gaps between projections. An opposite inclination for projections 37 is used as shown in FIG. 15a, nd rotationally successive rows of projections 37 preferably alternate between the inclinations of FIGS. 15 and 15a for moving material axially in opposite directions as the rotor turns.

Figure 8:
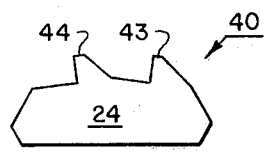
Figure 9:
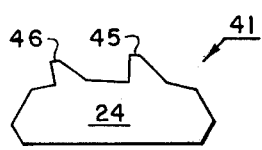
Figure 10:
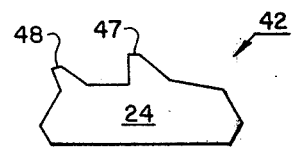
Figure 16:
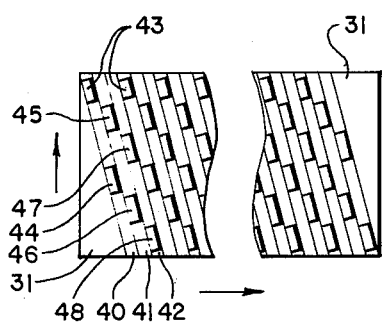
Figure 16A:
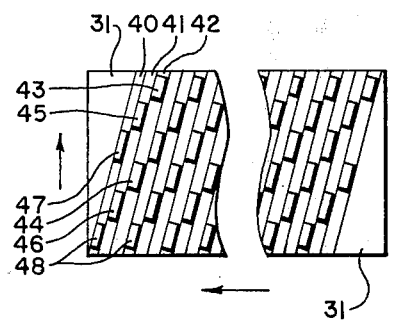

Two or more projections can be used on each plate as shown in plates 40-42 of FIGS. 8-10. Each of the plates 40-42 has a base 24 fitting in a rotor slot as previously described, and plates 40-42 have respective projections 43-48, preferably in different transverse positions as illustrated. Projection 43 is then positioned along the leading edge of the rotor slot, and projection 48 is positioned along a trailing edge of the rotor slot, with projections 44-47 located in intermediate transverse positions. A preferred way of arranging plates 40-42 is shown in FIGS. 16 and 16a where plates 40-42 are preferably inclined by wedges 31 as previously described and are preferably ordered in opposite sequences as illustrated for moving material in opposite axial directions as the rotor turns. Projections 43-48 then form double inclined rows for working through material.

The invention can also be practiced with two plates having a leading projection and a trailing projection and omitting an intermediate projection, or with four or more plates having two or more angularly spaced intermediate projections between the leading and trailing projections. The same principles apply in ordering the plates successively to achieve opposite axial movement as the rotor sweeps through the material. The inclination of the plates can also be varied, and the thickness of any spacer plates used can be varied relative to the thickness of projections 17-19. Futhermore, the configuration of slots, plate bases 24, and liner strips 20 can be varied considerably, and liner strips 20 can be omitted altogether if the edges of the plates are not too rough.

The choices between plates perpendicular to the rotor axis or oblique to the rotor axis and the use or omission of spacer plates depend both on the material being processed and the configuration of the stator within which the rotor turns. If the stator strongly resists circulational flow of the material layer, then the rotor preferably has more bars by omitting spacer plates and inclined bars by using end wedges, so long as the material can move between the rotor projections. The objective is for the rotor to move the material through the stator as the rotor bars move through the material, and if the rotor bars have too forceful a grip on the material and carry it along with the rotor, then the rotor bars are preferably reduced in number and separated by adding spacers 30 and perhaps changed from oblique to perpendicular to the rotor axis or to a smaller oblique angle.

Those skilled in the art will also appreciate the many variations that can be made in slot, plate, and liner strip configurations and will understand various fabrication and assembly possibilities.

I claim:

1. A rotor having a generally cylindrical body extending axially of a mixer-refiner-reactor, said body having a plurality of axially extending slots opening radially inward from the cylindrical periphery of said body, said slots being narrower at said periphery of said body than in a region radially inward from said periphery of said body, said rotor comprising:
   a. a plurality of flat plates extending generally transversely across said slots and arranged adjacent each other for substantially filling the axial length of each of said slots;
   b. said plates being shaped to fit in said slots to be held against radially inward facing edges of said slots at the limit of radial outward movement of said plates relative to said slots;
   c. at least some of said plates each having a projection extending radially outward beyond the periphery of said body; and
   d. said projections providing working surfaces engaging material being worked through said mixer-refiner-reactor.

2. The rotor of claim 1 including liner strips extending axially for the length of said slots and arranged to fit between said plates and the inside surfaces of said slots.

3. The rotor of claim 1 wherein some of said plates lacking projections are arranged between said plates having said projections to serve as spacers for separating said plates having said projections.

4. The rotor of claim 1 including means for orienting said plates in said slots at uniform acute angles relative to a plane perpendicular to the axis of said rotor body.

5. The rotor of claim 4 wherein some of said plates lacking projections are arranged between said plates having said projections to serve as spacers for separating said plates having said projections.

6. The rotor of claim 5 wherein said projections extend substantially across said slots and are separated by more than the thickness of said plates.

7. A rotor having a generally cylindrical body extending axially of a mixer-refiner-reactor, said body having a plurality of axially extending slots opening radially inward from the cylindrical periphery of said body, said slots being narrower at said periphery of said body than in a region radially inward from said periphery of said body, said rotor comprising:
   a. a plurality of flat plates extending generally transversely across said slots and arranged adjacent each other for substantially filling the axial length of each of said slots;
   b. said plates being shaped to fit in said slots to be held against radially inward facing edges of said slots at the limit of radial outward movement of said plates relative to said slots;
   c. at least some of said plates each having a projection extending radially outward beyond the periphery of said body;
   e. said projections providing working surfaces engaging material being worked through said mixer-refiner-reactor; and
   f. said projections on different ones of said plates differing from each other in the longitudinal positions of said projections along respective ones of said plates and said plates being arranged so said different positions of said projections are ordered relative to each other in a sequence repeating along the length of said slot to cooperate in moving material in an axial direction as said rotor turns.

8. The rotor of claim 7 wherein said different positions of said projections include leading projections arranged in the region of the rotationally leading edges of said slots, trailing projections arranged in the region of the rotationally trailing edges of said slots, and intermediate projections arranged between said leading projections and said trailing projections.

9. The rotor of claim 8 wherein a substantially equal number of said projections are ordered in each of two of said sequences for moving material in both axial directions as said rotor turns.

10. The rotor of claim 9 wherein all of said projections in any one of said slots are ordered in the same one of said sequences for moving material in the same axial direction as said rotor turns.

11. The rotor of claim 7 wherein some of said plates lacking projections are arranged between said plates having said projections to serve as spacers for separating said plates having said projections.

12. The rotor of claim 7 including means for orienting said plates in said slots at uniform acute angles relative to a plane perpendicular to the axis of said rotor body.

13. The rotor of claim 12 wherein some of said plates lacking projections are arranged between said plates having said projections to serve as spacers for separating said plates having said projections.

14. The rotor of claim 7 wherein each of said plates has more than one of said plurality of uniform projections.

15. The rotor of claim 14 wherein said different positions of said projections include leading projections arranged in the region of the rotationally leading edges of said slots, trailing projections arranged in the region of the rotationally trailing edges of said slots, and intermediate projections arranged between said leading projections and said trailing projections.

16. The rotor of claim 15 including means for orienting said plates in said slots at uniform acute angles relative to a plane perpendicular to the axis of said rotor body.

17. The rotor of claim 7 including liner strips extending axially for the length of said slots and arranged to fit between said plates and the inside surfaces of said slots.

* * * * *